(12) United States Patent
Miyahara et al.

(10) Patent No.: US 11,523,018 B1
(45) Date of Patent: Dec. 6, 2022

(54) IMAGE FORMING APPARATUS AND OPERATION MODE CONTROL METHOD THAT REDUCE DISCOMFORT WHEN RETURNING FROM ENERGY SAVING MODE

(71) Applicant: KYOCERA Document Solutions Inc., Osaka (JP)

(72) Inventors: Norifumi Miyahara, Torrance, CA (US); Yoshihiro Osada, Torrance, CA (US); Keizen Kanazawa, Osaka (JP); Kunihiko Shimamoto, Torrance, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/458,571

(22) Filed: Aug. 27, 2021

(51) Int. Cl.
*H04N 1/00* (2006.01)

(52) U.S. Cl.
CPC ..... *H04N 1/00896* (2013.01); *H04N 1/00835* (2013.01); *H04N 1/00978* (2013.01); *H04N 1/00997* (2013.01)

(58) Field of Classification Search
None
See application file for complete search history.

(56) References Cited

U.S. PATENT DOCUMENTS

| | | | |
|---|---|---|---|
| 10,104,258 B2 * | 10/2018 | Yamasaki | H04N 1/00336 |
| 10,757,284 B2 * | 8/2020 | Tanaka | H04N 1/00896 |
| 2012/0107006 A1 * | 5/2012 | Yoda | G03G 15/205 |
| | | | 399/70 |
| 2014/0104636 A1 * | 4/2014 | Baba | H04N 1/00896 |
| | | | 358/1.14 |
| 2015/0002877 A1 * | 1/2015 | Ono | G06F 21/81 |
| | | | 358/1.14 |
| 2015/0049923 A1 * | 2/2015 | Nobutani | G06F 21/608 |
| | | | 382/118 |
| 2017/0118364 A1 * | 4/2017 | Kato | H04N 1/00885 |
| 2018/0032013 A1 * | 2/2018 | Fukushima | H04N 1/00323 |
| 2018/0034995 A1 * | 2/2018 | Yokoyama | H04N 1/00037 |
| 2019/0373127 A1 * | 12/2019 | Tsuji | G06F 3/013 |

FOREIGN PATENT DOCUMENTS

JP 2015-066780 A 4/2015

* cited by examiner

*Primary Examiner* — Henok Shiferaw
(74) *Attorney, Agent, or Firm* — Hawaii Patent Services; Nathaniel K. Fedde; Kenton N. Fedde

(57) ABSTRACT

Provided is an image forming apparatus that reduces discomfort when returning from the energy saving mode. The image forming apparatus can switch between an energy saving mode and a normal mode that consumes more power than the energy saving mode as the operation mode. A human sensor can detect a person and calculate the distance to the person. An operation mode control unit raises the temperature of the fixing unit of the image forming unit when a person detected by the human sensor approaches within the first specific distance, and it start transport unit to be driven when the person approaches within a second specific distance, which is closer than the first specific distance.

10 Claims, 4 Drawing Sheets

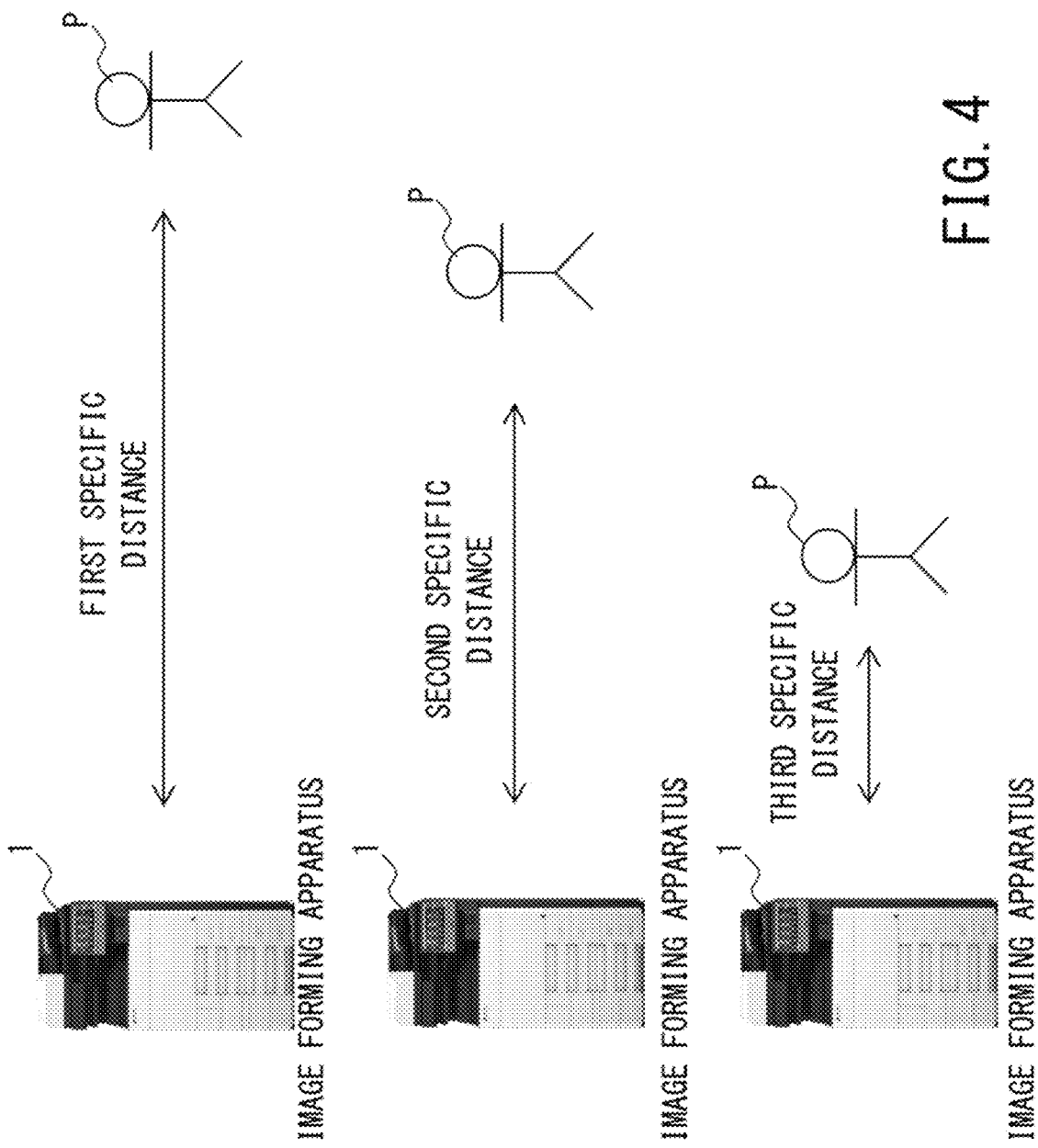

IMAGE FORMING APPARATUS AND OPERATION MODE CONTROL METHOD THAT REDUCE DISCOMFORT WHEN RETURNING FROM ENERGY SAVING MODE

BACKGROUND

The present disclosure particularly relates to an image forming apparatus and an operation mode control method capable of switching between an energy saving mode and a normal mode.

There is an image forming apparatus such as multifunctional peripheral (MFP) capable of printing documents and images.

There is the image forming apparatus that can be switched to an energy saving mode that consumes less power and a normal mode that consumes more power than the energy saving mode as operation modes.

In one of such typical image forming apparatuses, the operation mode is gradually returned from the power saving mode to the normal power mode according to the distance between the image forming apparatus and the wireless communication device.

SUMMARY

An image forming apparatus of the present disclosure is an image forming apparatus capable of switching between an energy saving mode and a normal mode that consumes more power than the energy saving mode as an operation mode, including: a human sensor that is capable to detect a person and calculate distance to the person; and operation mode control unit configured to raise temperature of a fixing unit of an image forming unit when the person detected by the human sensor approaches within a first specific distance and start transport unit to be driven when the person approaches within a second specific distance, which is closer than the first specific distance.

An operation mode control method of the present disclosure is an operation mode control method executed by an image forming apparatus capable of switching between an energy saving mode and a normal mode that consumes more power than the energy saving mode as an operation mode, including the steps of: detecting a person; calculating distance to the person; raising temperature of a fixing unit of an image forming unit when the person approaches within a first specific distance; and starting transport unit to be driven when the person approaches within a second specific distance, which is closer than the first specific distance.

BRIEF DESCRIPTION OF THE DRAWINGS

FIG. 4 is a conceptual diagram of the detection distance in the return control process as shown in FIG. 3.

DETAILED DESCRIPTION

Embodiment

[System Configuration of Image Forming Apparatus 1]

Figure 1:
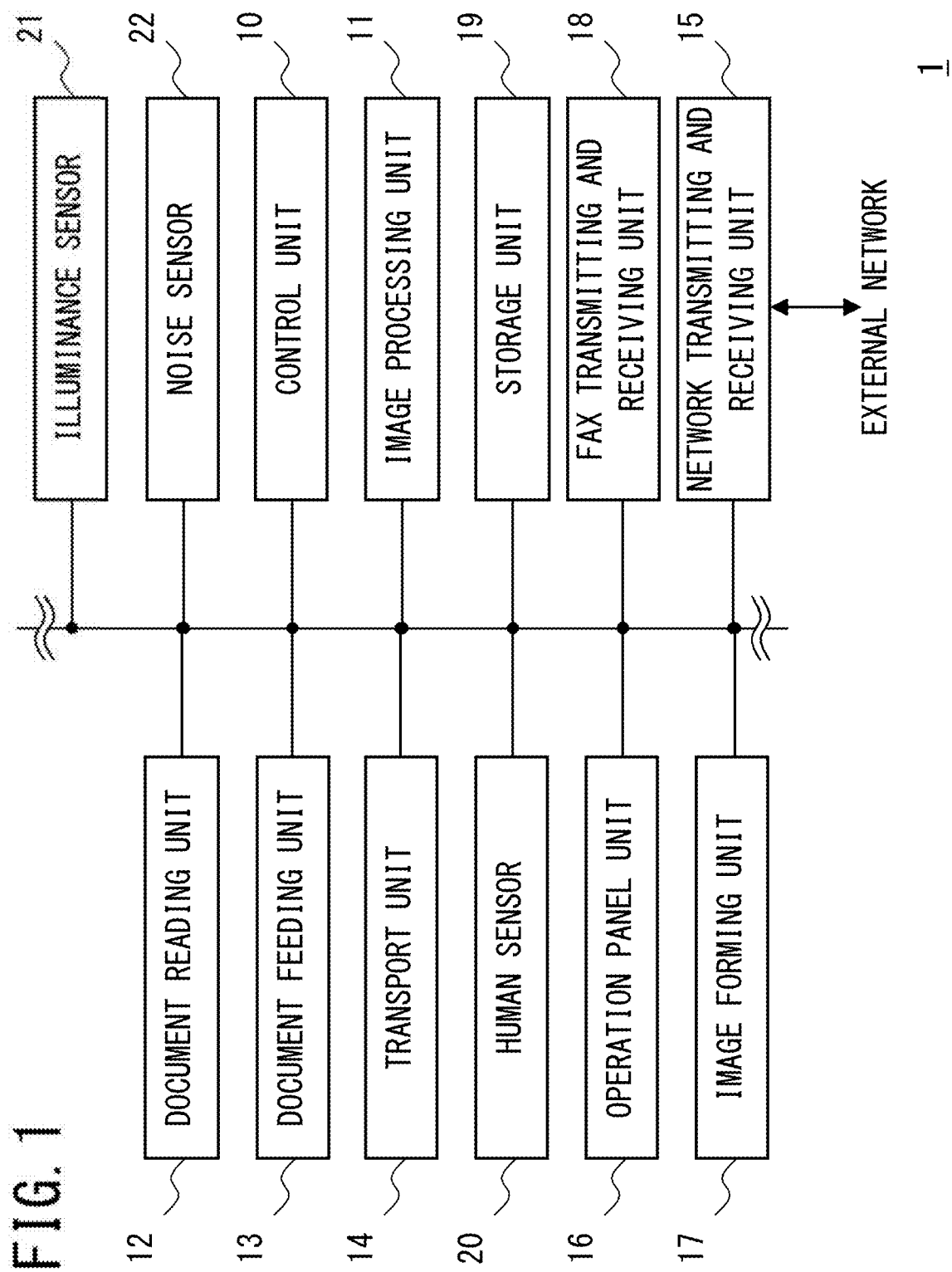
FIG. 1 is a system configuration diagram of an image forming apparatus according to an embodiment of the present disclosure.

Firstly, with reference to FIG. 1, a system configuration of the image forming apparatus 1 is described.

The image forming apparatus 1 includes a control unit 10, an image processing unit 11, a document reading unit 12, a document feeding unit 13, a transport unit 14, a network transmitting and receiving unit 15, an operation panel unit 16, an image forming unit 17, a FAX transmitting and receiving unit 18, and a storage unit 19, a human sensor 20, an illuminance sensor 21, a noise sensor 22, and the like. Each unit is connected to the control unit 10, and its operation is controlled by the control unit 10.

The control unit 10 an information processing unit such as a GPP (General Purpose Processor), a CPU (Central Processing Unit), an MPU (Micro Processing Unit), a DSP (Digital Signal Processor), a GPU (Graphics Processing Unit), an ASIC (Application Specific Integrated Circuit, a processor for specific applications), or the like.

The control unit 10 reads the control program stored in the ROM or HDD of the storage unit 19, expands the control program in the RAM, and executes the control program, so that the control unit 10 can operate as each part of the functional block as described later. Further, the control unit 10 controls the entire apparatus according to the instruction information input from the external terminal or the operation panel unit 16.

The image processing unit 11 is a control calculation unit such as a DSP (Digital Signal Processor), a GPU (Graphics Processing Unit), or the like. The image processing unit 11 performs image processing on an image data. This image processing may be, for example, processing such as enlargement/reduction, density adjustment, gradation adjustment, image improvement, and the like.

Further, the image processing unit 11 stores the image read by the document reading unit 12 in the storage unit 19 as print data. At this time, the image processing unit 11 can also convert the print data into an electronic document such as PDF, an image data file such as TIFF, or the like. Further, the image processing unit 11 may be able to execute at least a part of OCR (Optical Character Recognition) processing.

The document reading unit 12 reads the set document. Further, the document reading unit 12 is arranged above the main body of the image forming apparatus 1.

The document reading unit 12 includes a scanner, platen glass, and a document reading slit. When reading a document placed on the platen glass, the document reading unit 12 moves the scanner to a position facing the platen glass. On this basis, the document reading unit 12 reads the document placed on the platen glass while scanning the document to acquire image data. The document reading unit 12 stores the acquired image data in the storage unit 19.

Further, the document reading unit 12 moves the scanner to a position facing the document reading slit when reading the document supplied from the document feeding unit 13. Then, the document reading unit 12 reads the document through the document reading slit in synchronization with the document transport operation by the document feeding unit 13 to acquire image data. The document reading unit 12 stores the acquired image data in the storage unit 19.

The document feeding unit 13 conveys the document read by the document reading unit 12. The document feeding unit 13 is arranged above the document reading unit 12.

The document feeding unit 13 includes a document placing unit and a document transporting mechanism. The document feeding unit 13 feeds the documents placed on the document placing unit to the document reading unit 12 one by one by the document transport mechanism.

The transport unit 14 is a mechanism for feeding the recording papers one by one toward the image forming unit 17, transporting the recording paper on which the image is formed by the image forming unit 17, and discharging the recording paper to the stack tray. Therefore, the transport unit 14 includes a plurality of paper cassettes, paper feed rollers, transport rollers, discharge rollers, and the like.

Specifically, the recording paper fed out to the paper transport path by the paper feed roller is conveyed to the image forming unit 17 by the transfer roller. Then, the recording paper recorded by the image forming unit is discharged to the stack tray by the discharge roller.

The transport unit 14 is provided in the main body unit. In the present embodiment, a drive mechanism including a motor, or the like, for driving each part of the image forming unit 17 may be configured to operate in conjunction with the transport unit 14.

The network transmitting and receiving unit 15 is a network connection unit including a LAN board, a wireless transmitter/receiver, and the like, for connecting to an external network. The external network of the present embodiment is, for example, a LAN, a wireless LAN, a WAN, a mobile phone network, a voice telephone network, or the like.

The network transmitting and receiving unit 15 transmits/receives data on a data communication line, and it transmits/receives a voice signal on a voice telephone line.

The operation panel unit 16 includes an input unit such as a button, a touch panel, or the like, and a display unit such as an LCD (Liquid Crystal Display), an organic EL display, or the like. Further, the operation panel unit 16 is arranged on the front side of the image forming apparatus 1.

The buttons of the input unit of the operation panel unit 16 are a numeric keypad, a button for start, cancel, operation mode switching, giving instructions related to job execution, and the like. The operation mode may include various modes such as copying, fax transmission, scanner, network scanner, or the like. Also, the job include printing, sending, saving, recording, or the like, for selected documents. The input unit of the operation panel unit 16 acquires an instruction for a various job of the image forming apparatus 1 by the user. It is also possible to input and change the information of each user according to the user's instruction acquired from the operation panel unit 16.

In the present embodiment, the operation panel unit 16 can control the lighting of the backlight of the display unit, the LED of each button, and the like. As a result, the image forming apparatus 1 can be operated even if the installed room is dark.

The image forming unit 17 includes a photoconductor drum, an exposure unit, a developing unit, a transfer unit, and a fixing unit. The exposure unit is an optical unit having a laser device, a mirror, a lens, an LED array, or the like. Here, the exposed unit outputs light, or the like, to the photoconductor drum primarily charged by the charged unit to expose the photoconductor drum based on the image data, and it forms an electrostatic latent image on the surface of the photoconductor drum. The developing unit is a unit that develops an electrostatic latent image formed on a photoconductor drum by using toner. Here, the developing unit forms a toner image based on the electrostatic latent image on the photoconductor drum. The transfer unit transfers the toner image formed on the photoconductor drum by the developing unit to the recording paper. The fixing unit heats the recording paper on which the toner image is transferred by the transfer unit to fix the toner image on the recording paper. The fixing unit includes, for example, an electromagnetic induction (IH) heating coil and a transfer roller heated by the coil. In the present embodiment, the temperature of the transfer roller in the fixing unit needs to be a hundred and several tens of degrees Celsius or higher, and the power consumption is large. Further, the image forming unit 17 may be provided with a driving mechanism for driving the photoconductor drum, roller, or the like, inside of the unit. This drive mechanism may operate in conjunction with the driving of the transport unit 14.

The FAX transmitting and receiving unit 18 transmits/receives a facsimile. The FAX transmitting and receiving unit 18 can receive a facsimile from another FAX apparatus via a voice line, store the received image data in the storage unit 19, and cause the image forming unit 17 to form an image. Further, the FAX transmitting and receiving unit 18 can convert the document read by the document reading unit 12 and the network FAX data transmitted from the external terminal into image data, and it can facsimile-transmit to another FAX apparatus by the voice line.

The storage unit 19 is a non-transitory recording medium such as a semiconductor memory of a ROM (Read Only Memory), a RAM (Random Access Memory), or the like, or an HDD (Hard Disk Drive), or the like.

The RAM of the storage unit 19 may retain the stored contents by a function such as self-refresh even in the power saving state.

A control program for controlling the operation of the image forming apparatus 1 is stored in the ROM or HDD of the storage unit 19. In addition to this, the storage unit 19 also stores the user's account settings. Further, the storage unit 19 may include an area of a document box, which is a storage folder for each user.

The human sensor 20 is a sensor capable of detecting a person (human) around the image forming apparatus 1. The human sensor 20 may be an infrared sensor, a millimeter wave radar, a laser sensor, a camera, or the like.

In the present embodiment, the human sensor 20 can detect a person approaching close to the image forming apparatus 1 and calculate the distance from the image forming apparatus 1 to the person.

The illuminance sensor 21 is an optical sensor capable of measuring the illuminance of the surroundings (ambient illuminance) on which the image forming apparatus 1 is mounted (room). In the present embodiment, the illuminance sensor 21 acquires an illuminance value and can detect whether the room is bright or dark. In addition, the illuminance sensor 21 can be used for automatic brightness adjustment of the backlight, LED, and the like, in the display unit of the operation panel unit 16.

The noise sensor 22 is a sensor including a sound collecting microphone capable of detecting ambient noise (audio noise) on which the image forming apparatus 1 is mounted, an A/D (Analog to Digital) converter, and the like. The noise sensor 22 may also include a vibration sensor that detects vibration of the surrounding floor, or the like.

In addition, in the image forming apparatus 1, the control unit 10 and the image processing unit 11 may be integrally formed such as a CPU with built-in GPU, a chip-on module package, and an SOC (System On a Chip).

Further, the control unit 10 and the image processing unit 11 may have a built-in RAM, ROM, flash memory, or the like.

In addition, it is possible to configure the human sensor 20 and the illuminance sensor 21 in combination.

[Functional Configuration of Image Forming Apparatus 1]

Figure 2:
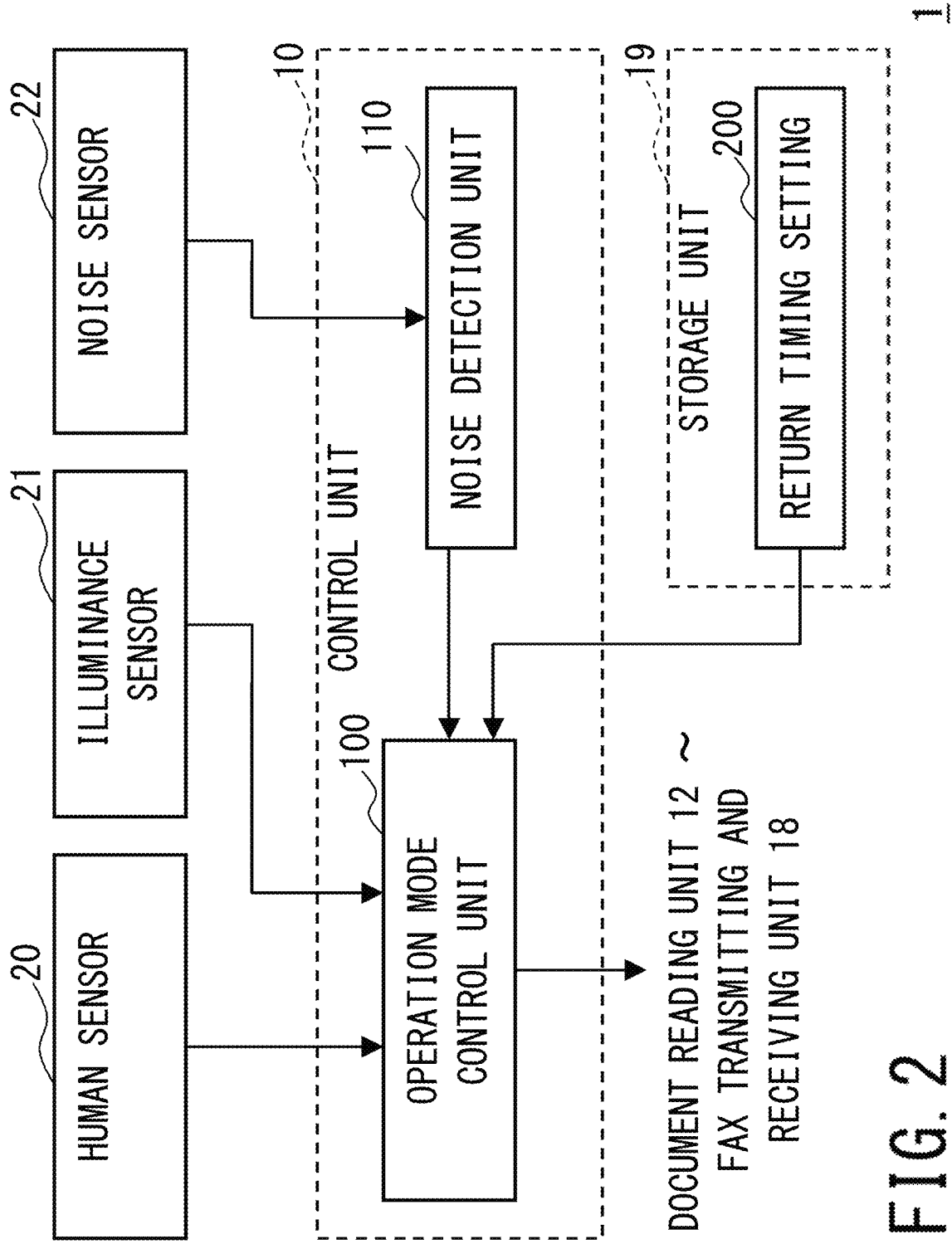
FIG. 2 is a block diagram showing a functional configuration of the image forming apparatus as shown in FIG. 1.

Here, with reference to FIG. 2, a functional configuration of the image forming apparatus 1 is described.

The image forming apparatus 1 according to the present embodiment can switch between an energy saving mode with lower power consumption and a normal mode with higher power consumption than the energy saving mode as an operation mode. In the energy-saving mode, at least the control unit 10, the network transmitting and receiving unit 15, the FAX transmitting and receiving unit 18, the storage unit 19, the human sensors 20, the illumination sensor 21, and the noise sensor 22 are turned on electricity. However, the power consumed by each part may be small. Further, at least the fixing unit of the image forming unit 17 and the transport unit 14 do not have to be turned on electricity.

On the other hand, in the normal mode, each of the above-mentioned units may be turned on electricity.

The control unit 10 of the image forming apparatus 1 includes an operation mode control unit 100 and a noise detection unit 110.

The storage unit 19 stores the return timing setting 200.

The operation mode control unit 100 raises the temperature of the fixing unit of the image forming unit 17 when the person detected by the human sensor 20 approaches within a first specific distance.

Then, the operation mode control unit 100 starts driving the transport unit 14 when the person detected by the human sensor 20 approaches within a second specific distance, which is closer than the first specific distance.

Further, the operation mode control unit 100 lights up the operation panel unit 16 when the person detected by the human sensor 20 approaches within a third specific distance, which is closer than the second specific distance.

That is, in the present embodiment, the distance becomes shorter in the order of the first specific distance, the second specific distance, and the third specific distance.

On the other hand, when the noise level detected by the noise detection unit 110 is equal to or higher than first noise level, the operation mode control unit 100 starts driving the transport unit 14 even when the person is farther than the second specific distance.

Further, the operation mode control unit 100 is also possible to switch the operation mode in the speed priority mode or the power saving priority mode as described later, regardless of each of the detection results of the human sensor 20 and the noise detection unit 110, based on the setting of the return timing setting 200.

Furthermore, the operation mode control unit 100 can switch the operation mode in the speed priority mode according to specific switching condition regardless of the setting of the return timing setting 200.

The specific switching condition includes the cases when the ambient illuminance detected by the illuminance sensor 21 is equal to or less than specific illuminance, when first specific time has not passed since the illuminance becomes higher than the specific illuminance, or when state in which the noise level is third noise level lower than the second noise level is elapsed from second specific time.

Among these, the first specific time is a relatively short time, for example, several seconds to several tens of minutes, or the like. The second specific time is a time longer than the first specific time, and is, for example, several minutes to several hours, or the like.

The noise detection unit 110 calculates the noise level from the ambient noise detected by the noise sensor 22. In the present embodiment, the noise level includes the first noise level, the second noise level, the third noise level. The first noise level indicates a state in which the magnitude of ambient noise is equal to or greater than the driving noise of the transport unit 14. The second noise level is lower than the first noise level, and the driving sound of the transport unit 14 can be heard well, which causes discomfort to the average person. The third noise level is lower than the second noise level, and there are few people around, or the like, so that the noise level is quiet, that is, the noise level is similar to the base level. That means, the amount of noise decreases in the order of the first noise level, the second noise level, and the third noise level.

The return timing setting 200 is setting data for controlling return timing, which is timing when the operation mode is returned from the power saving mode to the normal mode. In the present embodiment, in the return timing setting 200, any one of the comfort priority mode, the speed priority mode, and the power saving priority mode can be set from the operation panel unit 16, or the like.

Here, the details of the comfort priority mode, the speed priority mode, and the power saving priority mode is described. The comfort priority mode is, in the present embodiment, a setting for quickly returning from the power saving mode to the normal mode while reducing discomfort. In the comfort priority mode, in order to give priority to reduce the discomfort for the user, it is not always necessary to return from the energy saving mode at the fastest speed. Here, in the present embodiment, as a default (default value), an example in which the comfort priority mode is set in the return timing setting 200 is shown.

The speed priority mode is a setting for returning from the energy saving mode to the normal mode with speed priority without considering discomfort. In this speed priority mode, the units that take longer to recover from the power saving state are power supplied in order, and the normal mode is restored. The power saving priority mode is a setting to return from the energy saving mode to the normal mode, regardless of the each of detection result by the human sensor 20 and the noise detection unit 110, according to the operation by the user. The operation by the user includes, for example, the operation of the operation panel unit 16 by the user, the reception of a job via the network, and the like.

Here, the control unit 10 of the image forming apparatus 1 is made to function as the operation mode control unit 100 and the noise detection unit 110 by executing the control program stored in the storage unit 19.

Further, each part of the image forming apparatus 1 as described above becomes a hardware resource for executing the operation mode control method of the present disclosure.

In addition, apart or any combination of the above-mentioned functional configurations may be configured in hardware or circuit by IC, programmable logic, FPGA (Field-Programmable Gate Array), or the like.

Further, the noise level may be directly detected by the noise sensor 22.

[Return Control Process by Image Forming Apparatus 1]

Figure 3:
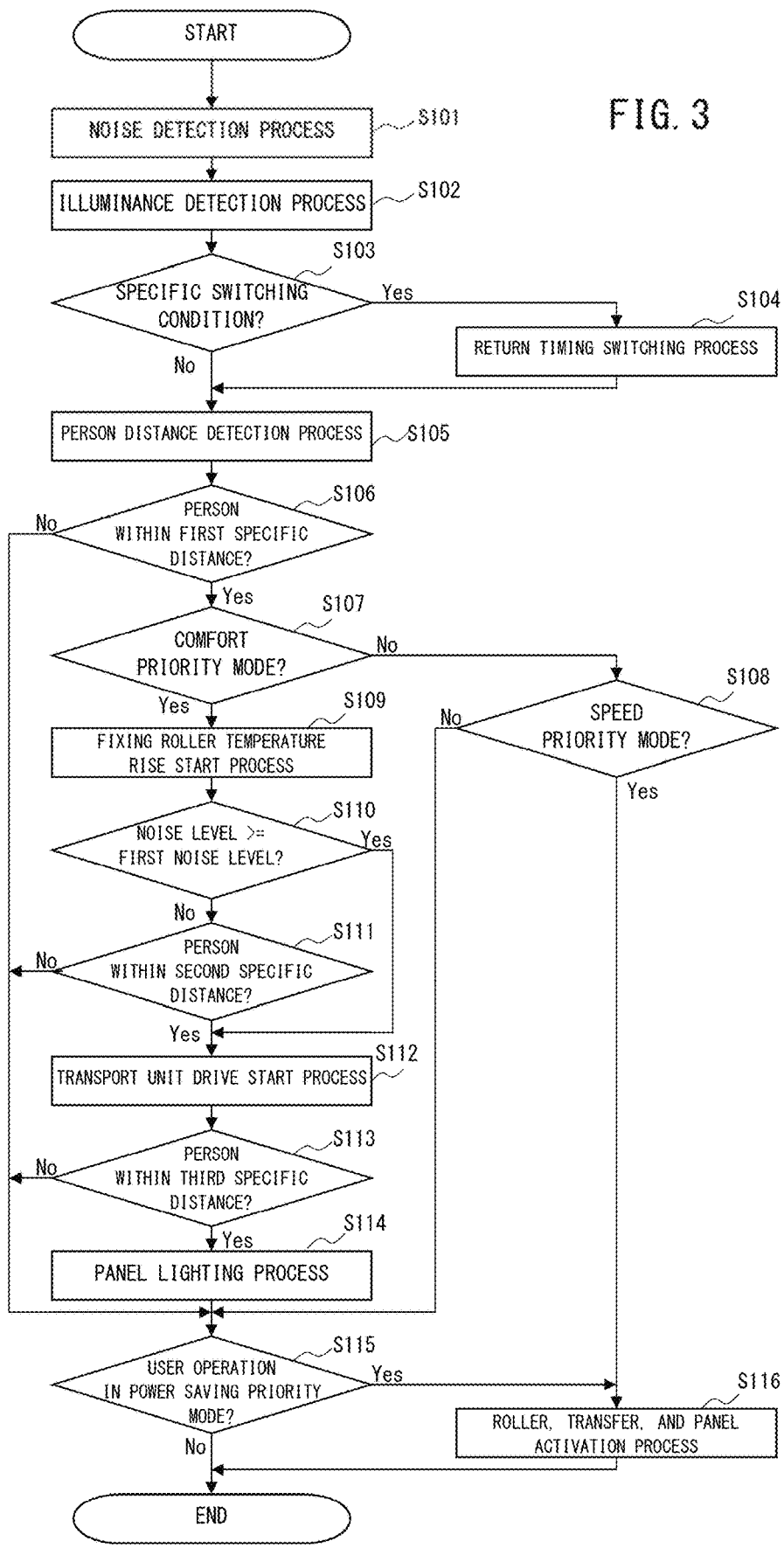
FIG. 3 is a flowchart of the return control process according to the embodiment of the present disclosure.

Next, with reference to FIGS. 3 to 4, the return control process by the image forming apparatus 1 according to the embodiment of the present disclosure is described.

In the return control process according to the present embodiment, when returning from the energy saving mode, a process to reduce discomfort of a person around the image forming apparatus 1 is executed. Here, when the image forming apparatus 1 is not in use, in the energy saving mode, each part shifts to the standby state to reduce power consumption. In this state, the human sensor 20 detects a person and calculates the distance to the person. Then, when the detected person approaches within the first specific distance, the fixing unit of the image forming unit is power supplied to raise the temperature of the transfer roller. On this basis, when the detected person approaches within the second specific distance, which is closer than the first specific distance, the transport unit 14 is started to be driven. Then, when the person detected by the human sensor 20 approaches within the third specific distance, which is closer than the second specific distance, the operation panel unit 16 is lighted up.

In the return control process according to the present embodiment, the control unit 10 mainly executes the program stored in the storage unit 19 in cooperation with each unit and uses the hardware resources.

Hereinafter, with reference to the flowchart of FIG. 3, the details of the return control process according to the present embodiment is described step by step.

(Step S101)

Firstly, the noise detection unit 110 performs a noise detection process.

The noise detection unit 110 detects the noise around the image forming apparatus 1 by the noise sensor 22 when the image forming apparatus 1 is in the energy saving mode state. The noise detection unit 110 calculates the noise level from the detected noise.

Specifically, the noise detection unit 110 performs FFT (Fast Fourier Transform), or the like, on data such as voice waveform data and vibration waveform data acquired from the noise sensor 22, and it divides the data into frequency bands. As a result, the noise detection unit 110 extracts frequency components corresponding to human speaking voices and human operating sounds or vibration excluding mechanical sounds or vibration, air conditioner sounds, and the like.

The noise detection unit 110 calculates, based on the magnitude of this frequency component, the ambient noise level as the first noise level (room with a lot of human activity), the second noise level (quiet room), and the third noise level (almost unmanned).

(Step S102)

Next, the operation mode control unit 100 performs an illuminance detection process.

The operation mode control unit 100 acquires the illuminance of the surroundings on which the image forming apparatus 1 is mounted by the illuminance sensor 21.

(Step S103)

Next, the operation mode control unit 100 determines whether or not it is a specific switching condition. Here, the operation mode control unit 100 determines whether or not the surroundings of the image forming apparatus 1, that is, the room in which the image forming apparatus 1 is mounted is substantially unmanned or not.

If the ambient illuminance detected by the illuminance sensor 21 is equal to or less than the specific illuminance, the operation mode control unit 100 determines that the room is dark and is almost unmanned.

On the other hand, if the illuminance is higher than the specific illuminance, the operation mode control unit 100 may determine that there is a person because the room is bright. However, the operation mode control unit 100 may determine that the illuminance is "almost unmanned" if the first specific time has not elapsed even if the illuminance is higher than the specific illuminance. This is because it can be determined that a user, or the like, who wants to use the image forming apparatus 1 has just entered the room and turned on the lighting.

Further, the operation mode control unit 100 may determine that the noise level calculated by the noise detection unit 110 is almost unmanned if the state of the third noise level has passed for the second specific time or more.

If the operation mode control unit 100 determines that these are almost unmanned, the operation mode control unit 100 determines Yes. In other cases, the operation mode control unit 100 determines No.

In the case of Yes, the operation mode control unit 100 advances the process to step S104.

In the case of No, the operation mode control unit 100 processes the scan proceeds to step S105.

(Step S104)

In the case of the specific switching condition, the operation mode control unit 100 performs a return timing switching process.

The operation mode control unit 100 can be determined that there is no person around who feels uncomfortable with the noise if the room is dark, if the room is bright for some time, or if the noise level continues to be at the base level.

Therefore, the operation mode control unit 100 sets the return timing setting 200 to the speed priority mode. That is, the operation mode control unit 100 can change from the comfort priority mode as default to the speed priority mode.

(Step S105)

Here, the operation mode control unit 100 and the human sensor 20 perform a person distance detection process.

The operation mode control unit 100 reads the signal of the human sensor 20 and determines whether or not the human sensor 20 has detected a person. If a person is detected, the operation mode control unit 100 acquires the calculated distance to the person.

(Step S106)

Next, the operation mode control unit 100 determines whether or not a person is detected within the first specific distance.

According to FIG. 4, the operation mode control unit 100 determines Yes if the distance calculated by the human sensor 20 for the person P is within the first specific distance. In other cases, the operation mode control unit 100 determines No.

In the case of Yes, the operation mode control unit 100 advances the process to step S107.

In the case of No, the operation mode control unit 100 advances the process to step S115.

(Step S107)

If a person is detected within the first specific distance, the operation mode control unit 100 determines whether the comfort priority mode is set or not. The operation mode control unit 100 determines Yes if the comfort priority mode is set in the return timing setting 200. The operation mode control unit 100 determines No if the comfort priority mode is not set.

In the case of Yes, the operation mode control unit 100 advances the process to step S109.

In the case of No, the operation mode control unit 100 advances the process to step S108.

(Step S108)

If the comfort priority mode is not set, the operation mode control unit 100 determines whether the speed priority mode is set or not. The operation mode control unit 100 determines Yes if the speed priority mode is set in the return timing setting 200. In other cases, the operation mode control unit 100 determines No.

In the case of Yes, the operation mode control unit 100 advances the process to step S116.

In the case of No, the operation mode control unit 100 advances the process to step S115.

(Step S109)

In the comfort priority mode, the operation mode control unit 100 performs the fixing roller temperature rise start process. Here, when returning from the energy saving mode, it takes time for the temperature of the fixing roller of the fixing unit to rise. Therefore, the operation mode control unit 100 supplies power to the fixing unit of the image forming unit 17 at the timing when a person is detected at the first specific distance, which is at a position far to some extent, and it starts to raise the temperature of the fixing roller. At this time, the operation mode control unit 100 does not yet need to drive the drive mechanism, or the like in the transport unit 14 or the image forming unit 17.

(Step S110)

Next, the noise detection unit 110 determines whether or not the noise level is equal to or higher than the first noise level. The noise detection unit 110 determines Yes if the calculated ambient noise level is equal to or higher than the first noise level. If the noise level is less than the first noise level, the noise detection unit 110 determines No.

In the case of Yes, the noise detection unit 110 advances the process to step S112.

In the case of No, the noise detection unit 110 advances the process to step S111.

(Step S111)

When the noise level is less than the first noise level, the operation mode control unit 100 determines whether the person is detected within the second specific distance or not.

According to FIG. 4, the operation mode control unit 100 determines Yes if the person P detected by the human sensor 20 approaches within the second specific distance. In other cases, the operation mode control unit 100 determines No.

In the case of Yes, the operation mode control unit 100 advances the process to step S112.

In the case of No, the operation mode control unit 100 advances the process to step S115.

(Step S112)

When the person is detected within the second specific distance, or when the noise level is equal to or higher than the first noise level, the operation mode control unit 100 performs the transport unit drive start process.

Here, the operation mode control unit 100 starts driving the transport unit 14 at the timing when it is confirmed that the person is closer to the image forming apparatus 1 than the first specific distance. This timing is the time when the person is detected at a second specific distance, which is closer than the first specific distance.

On the other hand, if the noise level is equal to or higher than the first noise level, the transport unit 14 is started to be driven even if the person is not approached within the second specific distance. This is because when the noise level around the image forming apparatus 1 is equal to or higher than the noise generated by driving the transport unit 14, the user does not feel uncomfortable even if the transport unit 14 is driven. Therefore, in order to shorten the returning time from the energy saving mode as much as possible, the transport unit 14 can be driven at this timing.

That is, the drive timing of the transport unit 14 can be changed according to the ambient noise level. In this way, when the ambient noise is loud, the operation is performed in the same manner as in the speed priority mode. As a result, from the time when the user is far away, the image forming apparatus 1 can perform processing accompanied by a large noise due to the return from the energy saving mode.

(Step S113)

Next, the operation mode control unit 100 determines whether the person is detected within the third specific distance or not.

According to FIG. 4, specifically, the operation mode control unit 100 determines Yes if the person P detected by the human sensor 20 approaches within the third specific distance. In other cases, the operation mode control unit 100 determines No.

In the case of Yes, the operation mode control unit 100 advances the process to step S114.

In the case of No, the operation mode control unit 100 advances the process to step S115.

(Step S114)

When the person is detected within the third specific distance, the operation mode control unit 100 performs a panel lighting process.

The operation mode control unit 100 lights up the operation panel unit 16 when the person is detected within the third specific distance. Specifically, the operation mode control unit 100 turns on the backlight, the LED, and the like in the display unit of the operation panel unit 16 to indicate the approaching person that it will be in operation in normal mode. That is, in the present embodiment, in the comfort priority mode, the operation panel unit 16 is lighted up last.

(Step S115)

Here, the operation mode control unit 100 determines whether or not there has been an operation by the user in the power saving priority mode. The operation mode control unit 100 determines Yes if the user operates the operation panel unit 16 or if a job is received via the network. In other cases, the operation mode control unit 100 determines No.

In the case of Yes, the operation mode control unit 100 advances the process to step S116.

In the case of No, the operation mode control unit 100 ends the return control process. If the detected person leaves the image forming apparatus 1, the operation mode control unit 100 may return to the energy saving mode. After that, the operation mode control unit 100 returns the process to step S101, continues noise detection, illuminance detection, and person distance detection, and waits until the person approaches within the first specific distance.

(Step S116)

When the user is detected within the first specific distance in speed priority mode, or when there is the user operation in power saving priority mode, the operation mode control unit 100 performs a roller, transfer, and panel activation process.

Here, each part is power supplied and returned. Specifically, the operation mode control unit 100 supply power to all the fixing roller of the fixing unit in the image forming unit 17, the transport unit 14, the LED of the display unit in the operation panel unit 16, and the like, and returns the energy saving mode to the normal mode.

Alternatively, the operation mode control unit 100 does not have to return all the units at the same time.

Specifically, for example, in the speed priority mode, the operation mode control unit 100 may light up the operation panel unit 16 after detecting a person within the third specific distance.

Alternatively, even if the user operates in the power saving priority mode, the transport unit 14 may be started to be driven at the timing when a person approaches within the third specific distance before the operation panel unit 16 is lighted up.

As described above, the return control process according to the embodiment of the present disclosure is completed.

As configured in this way, the following effects can be obtained.

A typical image forming apparatus shifts to a standby state and shifts to an energy saving mode for reducing power consumption when not in use. However, since it takes time to return from the energy saving mode, the user has to wait until the image forming apparatus becomes available.

As a means for solving the problem to some extent, a typical image forming apparatus may include a human sensor. When the human sensor detects an object in front of the image forming apparatus, it can automatically return from the energy saving mode and shorten the waiting time.

However, even if a person who does not use the image forming apparatus, a person who just passes in front of the person, or a heat source other than a human being, for example, a warm air flow of heating, is detected, the human sensor detects them, and the image forming apparatus return from the energy saving mode. For this reason, the user may be uncomfortable.

One of the reasons of the discomfort is the driving sound of the driving unit, and another is the lighting of the backlight of the operation panel unit. This is because humans are often stressed by apparatuses that start operating without any warning. On the other hand, this stress is relieved after a person approaching.

Therefore, in another typical image forming apparatus, the return process is gradually advanced according to the distance from the wireless communication device, so that the power consumption mode is returned from the power saving mode to the normal power mode.

However, even in this typical image forming apparatus, the driving unit that the user feels most uncomfortable is driven first. For this reason, the driving sound causes discomfort to many users who have no use for the image forming apparatus.

On the other hand, the image forming apparatus 1 according to the embodiment of the present disclosure is an image forming apparatus capable of switching between an energy saving mode and a normal mode that consumes more power than the energy saving mode as an operation mode, including: a human sensor 20 that is capable to detect a person and calculate distance to the person; and operation mode control unit 100 that raises temperature of a fixing roller by power supplied to a fixing unit of an image forming unit 17 when the person detected by the human sensor 20 approaches within a first specific distance and start transport unit 14 to be driven when the person approaches within a second specific distance, which is closer than the first specific distance.

With such a configuration, it is possible to reduce discomfort to a person who does not use the image forming apparatus 1 when returning from the energy saving mode of the image forming apparatus 1. On the other hand, for the user who uses the image forming apparatus 1, the recovery time from the energy saving mode can be shortened as much as possible. As a result, the image forming apparatus 1 can be motivated to be used and can be used more easily.

Further, in the image forming apparatus 1 according to the embodiment of the present disclosure, the operation mode control unit 100 lights up operation panel unit 16 when the person detected by the human sensor 20 approaches within a third specific distance, which is closer than the second specific distance.

With such a configuration, even if the transport unit 14 is driven, it is possible to suppress the surprise caused by the sudden lighting of the backlight, the LED, or the like, of the display unit in the operation panel unit 16. As a result, the discomfort to the user can be further reduced.

Further, the image forming apparatus 1 according to the embodiment of the present disclosure is further provided with a noise detecting unit 110 for detecting an ambient noise level. With this configuration, it is possible to control the return timing according to the noise level around the image forming apparatus 1.

Further, in the image forming apparatus 1 according to an embodiment of the present disclosure, the operation mode control unit 100 start driving a transport unit 14 when the noise level detected by the noise detection unit 110 is equal or greater than first noise level and even when the person is farther from the second specific distance.

With this configuration, when the noise level is high, there is no concern that driving the transport unit 14 causes discomfort, so that it is possible to return from the energy saving mode to the normal mode at a higher speed.

In the image forming apparatus 1 according to an embodiment of the present disclosure, the operation mode control unit 100 can switch operation mode to speed priority mode that returns the energy saving mode to the normal mode with speed priority regardless of each of detection results of the human sensor 20 and the noise detection unit 110, or power saving priority mode that returns the energy saving mode to the normal mode according to the operation by the user regardless of each of detection results of the human sensor 20 and the noise detection unit 110.

With this configuration, for example, it is possible to control the timing of returning from the energy saving mode to the normal mode according to the user's intention by the return timing setting 200.

Further, the image forming apparatus 1 according to the embodiment of the present disclosure further includes an illuminance sensor 21, and the operation mode control unit 100 switches the operation mode with the speed priority mode when ambient illuminance detected by the illuminance sensor 21 is equal to or less than specific illuminance, when first specific time is not elapsed since the illuminance becomes higher than the specific illuminance, or when state in which the noise level is third noise level lower than the second noise level is elapsed from second specific time.

With this configuration, when the room in which the image forming apparatus 1 is mounted is almost unmanned, it is possible to return from the energy saving mode to the normal mode at the fastest timing without considering the fear of causing discomfort to the surrounding people.

Other Embodiments

In the embodiment of the present disclosure, it is described that the transport of the transport unit 14 is always started when the detected person approaches within the second specific distance.

However, when the noise level detected by the noise detection unit 110 is equal to or lower than second noise level, the operation mode control unit 100 may delay the start driving of the transport unit 14 or may not start driving the transport unit 14 until the job execution is instructed.

With this configuration, it is possible that, in a quiet environment, the drive timing of the transport unit 14 may be delayed as much as possible, or the transport unit 14 may not be driven until a job that requires to print, such as printing, copying, or the like, is executed by the user's operation.

Also, after the user send a job for printing, until the user arrives at the image forming apparatus 1 and gives a printing instruction, a process for preventing the transport unit 14 from being driven may be performed as in the power saving priority mode.

By performing such fine control, when the surroundings are quiet, by processing with a loud sound is performed only when the user is nearby, it is possible to further reduce discomfort to surrounding people.

In the above-described embodiment, an example of grasping the surrounding situation of the image forming apparatus 1 by the illuminance sensor 21 and the noise sensor 22 has been described.

However, other various sensors (groups) that acquire information about the surrounding environment of the image forming apparatus 1 may be provided. For example, as these sensors (groups), an air sensor that measures the concentration of carbon dioxide in the air, a radar sensor or a laser sensor that detects the amount of human activity in the room, or the like, may be provided. Further, the human sensor 20 may be able to measure the amount of human activity.

With this configuration, it is possible to confirm the situation more accurately such as whether the person is active or almost unmanned in the room where the image forming apparatus 1 is placed. This makes it possible to execute each process according to the above-described embodiment with higher accuracy.

In the above-described embodiment, the drive of the transport unit 14 is described so as to be driven in conjunction with the drive mechanism of the image forming unit 17.

However, it is also possible to drive the transport unit 14 and the drive mechanism of the image forming unit 17, separately. For example, the one that is less noisy and takes longer to reach a constant speed may be driven first.

In the above-described embodiment, an example of returning from the energy saving mode to the normal mode for executing the printing job has been described, mainly.

However, for the other job, such as copying, scanning, network scanning, or the like, it is also possible to apply the aim of the above-described processing and control the noise and the power supply to the operation panel unit 16.

Further, the present disclosure can be applied to an information processing apparatus other than the image forming apparatus. That is, a network scanner, a server, or the like, to which the scanner is separately connected by USB, or the like, may be used.

Further, it goes without saying that the configuration and operation of the above-described embodiment are examples, and it can be appropriately modified and executed without departing from the aim of the present disclosure.

What is claimed is:

1. An image forming apparatus capable of switching between an energy saving mode and a normal mode that consumes more power than the energy saving mode as an operation mode, comprising:
   a human sensor that is capable to detect a person and calculate distance to the person;
   operation mode control unit configured to raise temperature of a fixing unit of an image forming unit when the person detected by the human sensor approaches within a first specific distance;
   a start transport unit to be driven when the person approaches within a second specific distance, which is closer than the first specific distance; and
   a noise detection unit configured to detect noise level of surroundings, wherein
   the operation mode control unit starts driving a transport unit when the noise level detected by the noise detection unit is equal or greater than a first noise level and even when the person is farther than the second specific distance.

2. The image forming apparatus according to claim 1, wherein
   the operation mode control unit lights up operation panel unit when the person approaches within a third specific distance, which is closer than the second specific distance.

3. The image forming apparatus according to claim 1, wherein
   the operation mode control unit delays the start driving of the transport unit or not starts the transport unit until the job execution is instructed when the noise level detected by the noise detection unit is equal to or lower than a second noise level.

4. An image forming apparatus capable of switching between an energy saving mode and a normal mode that consumes more power than the energy saving mode as an operation mode, comprising:
   a human sensor that is capable to detect a person and calculate distance to the person;
   operation mode control unit configured to raise temperature of a fixing unit of an image forming unit when the person detected by the human sensor approaches within a first specific distance;
   a start transport unit to be driven when the person approaches within a second specific distance, which is closer than the first specific distance; and
   a noise detection unit configured to detect noise level of surroundings, wherein
   the operation mode control unit is capable of switching operation mode to
   speed priority mode that returns the energy saving mode to the normal mode with speed priority regardless of each of detection results of the human sensor and the noise detection unit, or
   power saving priority mode that returns the energy saving mode to the normal mode according to the operation by the user regardless of each of detection results of the human sensor and the noise detection unit.

5. The image forming apparatus according to claim 4, further comprising:
   an illuminance sensor; and
      the operation mode control unit switches the operation mode with the speed priority mode when ambient illuminance detected by the illuminance sensor is equal to or less than specific illuminance, when first specific time is not elapsed since the illuminance becomes higher than the specific illuminance, or when state in which the noise level is third noise level lower than the second noise level is elapsed from second specific time.

6. An operation mode control method executed by an image forming apparatus capable of switching between an energy saving mode and a normal mode that consumes more power than the energy saving mode as an operation mode, comprising the steps of:
   detecting a person;
   calculating distance to the person;
   raising temperature of a fixing unit of an image forming unit when the person approaches within a first specific distance;

starting transport unit to be driven when the person approaches within a second specific distance, which is closer than the first specific distance;

detecting noise level of surroundings; and driving a transport unit to start when the noise level detected by the noise detection unit is equal or greater than a first noise level and even when the person is further away than the second specific distance.

7. The operation mode control method according to claim 6, further comprising a step of:

lighting up operation panel unit when the person approaches within a third specific distance, which is closer than the second specific distance.

8. The operation mode control method according to claim 6, further comprising a step of:

delaying the start driving of the transport unit or not starting driving the transport unit until the job execution is instructed when detected noise level is equal to or lower than second noise level.

9. The operation mode control method according to claim 6, further comprising a step of:

switching the operation mode to speed priority mode that returns the energy saving mode to the normal mode with speed priority regardless of the each of detection results of a human sensor and a noise detection unit, or power saving priority mode that returns the energy saving mode to the normal mode according to the operation by the user regardless of each of the detection results of the human sensor and the noise detection unit.

10. The operation mode control method according to claim 9, further comprising a step of:

switching the operation mode with the speed priority mode when ambient illuminance detected by the illuminance sensor is equal to or less than specific illuminance, when first specific time is not elapsed since the illuminance becomes higher than the specific illuminance, or when state in which the noise level is third noise level lower than the second noise level is elapsed from second specific time.

* * * * *